(12) United States Patent
Philippart et al.

(10) Patent No.: US 10,495,215 B2
(45) Date of Patent: Dec. 3, 2019

(54) METHOD TO CONTROL A SOLENOID'S CURRENT RECIRCULATION PATH TO ENABLE A SPECIFIC ECU DESIGN TO BE APPLIED TO MULTIPLE TRANSMISSION ARCHITECTURES

(71) Applicant: GM Global Technology Operations LLC, Detroit, MI (US)

(72) Inventors: Timothy P. Philippart, Orion, MI (US); Robert J. Horner, Dexter, MI (US); Michael R. Grimes, Saline, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 15/903,645

(22) Filed: Feb. 23, 2018

(65) Prior Publication Data

US 2019/0264804 A1    Aug. 29, 2019

(51) Int. Cl.
*F16H 61/02* (2006.01)
*F16H 61/00* (2006.01)

(52) U.S. Cl.
CPC ..... *F16H 61/0251* (2013.01); *F16H 61/0006* (2013.01); *F16H 2061/026* (2013.01)

(58) Field of Classification Search
None
See application file for complete search history.

(56) References Cited

U.S. PATENT DOCUMENTS

| 4,979,542 A * | 12/1990 | Mesenich | F02M 47/027 137/625.27 |
| 8,140,211 B2 | 3/2012 | Grimes et al. | |
| 2009/0234536 A1* | 9/2009 | Gopalakrishnan | B60G 17/06 701/37 |

* cited by examiner

Primary Examiner — Justin Holmes (57) ABSTRACT

A method for controlling a vehicle transmission includes electrically connecting a Transmission or Powertrain Control Unit (TCU or PCU) to the vehicle transmission, the TCU or PCU controlling operation of the transmission and having switchable power on a high side, and switchable ground on a low side of a plurality of solenoids in a shared functional grouping configuration, proportionally controlling an amount of current through a load such as a solenoid via controlling an amount of time current is being sunk through the solenoid to ground and controlling an amount of time current is provided via an adaptable recirculation path in the TCU or PCU, the recirculation path minimizing current decay when the solenoid is driven in an OFF state. The TCU or PCU having a single hardware layout, but being electronically adaptable to control a plurality of transmission types and solenoid architectures based on any desired functional solenoid grouping.

20 Claims, 4 Drawing Sheets

METHOD TO CONTROL A SOLENOID'S CURRENT RECIRCULATION PATH TO ENABLE A SPECIFIC ECU DESIGN TO BE APPLIED TO MULTIPLE TRANSMISSION ARCHITECTURES

INTRODUCTION

The statements in this section merely provide background information related to the present disclosure, and may not constitute prior art. The present disclosure relates to motor vehicle transmissions, and more specifically to systems and method for controlling the operation of motor vehicle transmissions. Emissions standards, environmental concerns, as well as operator perceptions of responsiveness and smoothness dictate many of the ways in which motor vehicle transmissions are controlled. In the pursuit of lowering emissions and improving operator perceptions of responsiveness and smoothness, transmissions have become increasingly mechanically complex with greater and greater quantities of gear ratios in automatic and dual clutch transmissions (DCT), and by infinite gear ratios in continuously variable (CVT) transmissions. To effectively and efficiently control and manage such increasingly mechanically and operationally complex transmissions, transmission control modules or units (TCU) and/or powertrain control modules or units (PCU) have, likewise, become increasingly complex, as has the programming within the TCUs or PCUs. Dedicated computer hardware is often required to manage each individual transmission type, and even to control transmission sub-types (say a 6-speed DCT versus a 7-speed DCT). Additionally, depending on the transmission type, typical transmission management strategies offer at least one of several default gear ratio options ranging from a neutral default to a specific gear ratio or multiple gears based on vehicle speed. The manner in which the transmission management system provides such default ratios varies depending on the type of transmission being controlled and directly influences the TCU or PCU hardware design by means of power distribution and groupings of various transmission control solenoids. However, the production of dedicated computer hardware, paired only with specific transmissions can be complex and financially costly, Thus, while current transmission control systems and TCUs operate for their intended purpose, there is a need for a new and improved transmission control system and TCU architecture that reduces hardware cost, improves reliability, and offers improved safety and redundancy for motor vehicle operators.

SUMMARY

According to several aspects of the present disclosure a method for controlling a motor vehicle transmission disposed within a motor vehicle includes electrically connecting a Transmission Control Unit (TCU) or Powertrain Control Unit (PCU) to the motor vehicle transmission, the TCU or PCU having switchable power on a high side of a plurality of solenoids in a shared functional grouping configuration, and a switchable ground on a low side of the solenoids, the TCU or PCU controlling operation of the transmission. The method further includes proportionally controlling an amount of current through a load such as a solenoid via controlling an amount of time current is being sunk through the solenoids to ground and controlling an amount of time current is provided via a recirculation path in the TCU or PCU, the recirculation path minimizing a decay of current when the solenoids are being driven in an OFF state. The TCU or PCU includes a single hardware layout, and wherein the TCU or PCU is electronically adaptable to control a plurality of motor vehicle transmission types and solenoid architectures based on any desired functional solenoid grouping.

In another aspect of the present disclosure the plurality of transmission types includes a continuously variable transmission (CVT), a dual clutch transmission (DCT), an automatic transmission, and a clutch to clutch (C2C) transmission, and wherein the plurality of solenoids further include variable force solenoids (VFS), variable bleed solenoids (VBS), and binary mode solenoids.

In another aspect of the present disclosure proportionally controlling an amount of current through a load solenoid further includes minimizing current recirculation path lengths and minimizing current loop impedance.

In another aspect of the present disclosure proportionally controlling an amount of current through a load such as a solenoid further includes maintaining electrical isolation between two or more banks of solenoids.

In another aspect of the present disclosure proportionally controlling an amount of current through a load such as a solenoid further includes minimizing electromagnetic radiation interference inside or outside of the motor vehicle.

In another aspect of the present disclosure the method further includes modulating line pressure to provide at least one default gear ratio via a plurality of mode control valves, and wherein line pressure control is separated from clutch control within the motor vehicle transmission.

In another aspect of the present disclosure the TCU or PCU interacts with a plurality of high side drivers (HSDs) enabling actuation of the motor vehicle transmission.

In another aspect of the present disclosure a quantity of HSDs and solenoid groupings varies with respect to the motor vehicle transmission type and desired motor vehicle transmission behavior during predetermined fault scenarios.

In another aspect of the present disclosure proportionally controlling an amount of current further includes selectively initiating current flow through one of a plurality of current recirculation paths back to a desired HSD based upon a defined solenoid grouping and power distribution.

In another aspect of the present disclosure a system for controlling a motor vehicle transmission disposed within a motor vehicle includes a transmission control unit (TCU) or powertrain control unit (PCU) electrically connected via a plurality of input and output pins to a motor vehicle transmission, the TCU or PCU having switchable power on a high side of a plurality of transmission solenoids in a shared configuration, and a switchable ground on a low side of the plurality of solenoids. The system further includes a power source providing power to the TCU or PCU. The TCU or PCU has a computer readable memory, and a processor configured to execute control logic stored in the computer readable memory. The control logic includes a first control logic for initializing the TCU or PCU to recognize the motor vehicle transmission, a second control logic for utilizing the TCU or PCU to control operation of the transmission, a third control logic proportionally controlling an amount of current flowing through a solenoid of the transmission via a current recirculation path in the TCU or PCU, the current recirculation path minimizing a decay of current when the solenoid is driven in an OFF state, and a fourth control logic selectively initiating current flow through one of a plurality of current recirculation paths. The TCU or PCU includes a single hardware design configuration, and the TCU or PCU is electronically adaptable to control a plurality of motor vehicle transmission types and solenoid architectures.

In another aspect of the present disclosure the plurality of transmission types includes a continuously variable transmission (CVT), a dual clutch transmission (DCT), an automatic transmission, and a clutch to clutch (C2C) transmission, and wherein the plurality of solenoids includes a variable force solenoid (VFS), variable bleed solenoid (VBS) and a binary or mode control solenoid or valve.

In another aspect of the present disclosure the third control logic further includes logic for minimizing current recirculation paths, maintaining electrical isolations between banks of solenoids, minimizing current loop impedance, and minimizing electromagnetic radiation interference both inside and outside of vehicle.

In another aspect of the present disclosure line pressure control is separated from clutch control.

In another aspect of the present disclosure the control logic further includes a fifth control logic modulating line pressure to provide at least one default gear ratio via a plurality of mode control valves disposed in the motor vehicle transmission.

In another aspect of the present disclosure the TCU or PCU interacts with a plurality of high side drivers (HSDs) controlling actuation of the transmission, wherein a quantity of HSDs varies with respect to transmission type and a desired grouping of solenoids.

In another aspect of the present disclosure the third control logic further includes selectively initiating current flow through one of a plurality of current recirculation paths back to a desired HSD based on preferred groupings.

In another aspect of the present disclosure when the TCU or PCU is electrically connected to a continuously variable transmission (CVT), the TCU or PCU controls the CVT through an equal or balanced number of solenoid loads per HSD to generate a predetermined set of gear ratios.

In another aspect of the present disclosure when the TCU or PCU is electrically connected to a clutch to clutch automatic transmission, the TCU or PCU controls the clutch to clutch automatic transmission through an unequal number of solenoid loads per HSD to generate a predetermined set of gear ratios and predetermined clutch activation sequences via a plurality of mode valves.

In another aspect of the present disclosure the fourth control logic further includes selecting a current recirculation path based on operating conditions of an engine and the motor vehicle transmission coupled to the engine, to provide either a desired or predetermined default gear ratio.

In another aspect of the present disclosure a motor vehicle propulsion system includes an engine, a transmission mechanically or fluidly coupled to the engine, an electrical power source providing power to a transmission control unit (TCU) or powertrain control unit (PCU), the TCU or PCU controlling operation of the transmission. The TCU or PCU includes a plurality of input and output pins electrically connectable to the transmission, switchable power on a high side of a plurality of solenoids of the transmission in a shared configuration, and a switchable ground on a low side of the plurality of solenoids. The TCU or PCU further includes circuit architecture structured to minimize current recirculation path lengths, provide electrical isolation between logical groupings of solenoids, minimize current loop impedance, and minimize electromagnetic radiation interference. The TCU or PCU further includes a computer readable memory, and a processor configured to execute control logic stored in the computer readable memory. The control logic includes a first control logic for upon powering up the TCU or PCU, initializing the TCU or PCU to recognize the transmission, a second control logic for controlling normal operation of the transmission by proportionally controlling an amount of current flowing through a solenoid of the transmission via a current recirculation path in the TCU or PCU, the current recirculation path minimizing a decay of current when the solenoid is driven in an OFF state, and a third control logic for, upon detecting a fault; selectively initiating current flow through one of a plurality of current recirculation paths and setting a mechanical default position of the transmission. The TCU or PCU includes a single hardware layout, and the TCU or PCU is electronically adaptable to control a plurality of transmission types and solenoid architectures, and the plurality of solenoids includes a variable force solenoid (VFS), a variable bleed solenoid (VBS) or and a binary or mode control solenoid.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
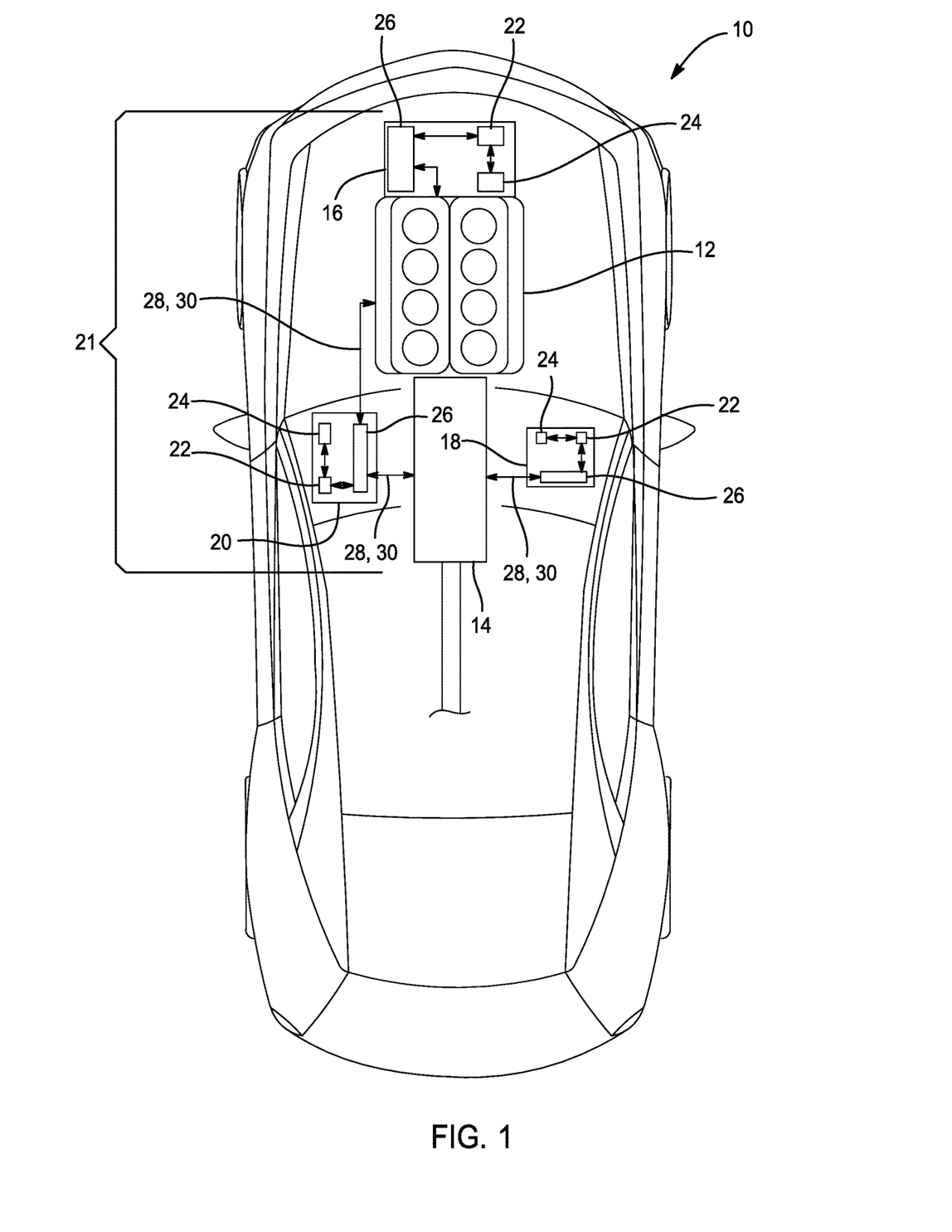
FIG. 1 is an environmental view of a system for controlling a motor vehicle transmission according to an aspect of the present disclosure.

Referring to FIG. 1, a motor vehicle is shown and indicated generally by reference number 10. The motor vehicle 10 is equipped with an engine 12 coupled to a transmission 14. The engine 12 may be an internal combustion engine, an electric engine, or any other type of prime mover without departing from the scope of the present disclosure. The transmission 14 may be an automatic, multi-clutch, or continuously variable transmission, or any other type of electronically and/or hydraulically-controlled automotive transmission without departing from the scope of the present disclosure. The transmission 14 is mechanically, and/or fluidly coupled to the engine 12. An engine control unit or module (ECU) 16 is electrically connected to and controls operation of the engine 12. A transmission control unit or module (TCU) 18 is in electronic communication with the transmission 14 and controls operation of the transmission 14. In some instances, the engine 12 and the transmission 14 are controlled in by a single control module or unit often referred to as a powertrain control module or powertrain control unit (PCU) 20. That is, the PCU 20 combines the functionality of the ECU 16 and the TCU 18.

For the sake of simplicity henceforth control of the transmission 14 will be discussed as being managed by a PCU 20. However, it should be appreciated that in various applications, control of the internal operation of the transmission 14 may be managed by a PCU 20, by a TCU 18, or the like without departing from the scope or intent of the present disclosure. More generally, the transmission 14, TCU 18, and PCU 20 and components within each may be more generally referred to as a transmission management system 21.

The PCU 20 is a non-generalized, electronic control device having a preprogrammed digital computer or processor 22, memory or non-transitory computer readable medium 24 used to store data such as control logic, instructions, lookup tables, etc., and a plurality of input/output peripherals or ports 26. The processor 22 is configured to execute the control logic or instructions. The PCU 20 may have additional processors 22 or additional integrated circuits in communication with the processor 22, such as logic circuits for controlling operation of the engine 12, and/or other components of a drivetrain of the motor vehicle 10. Likewise, PCU 20 may have additional processors 22 or integrated circuits in communication with the processor 22 that may control other aspects of the motor vehicle 10, including suspension, emissions controls, and the like without departing from the scope or intent of the present disclosure.

Figure 2:
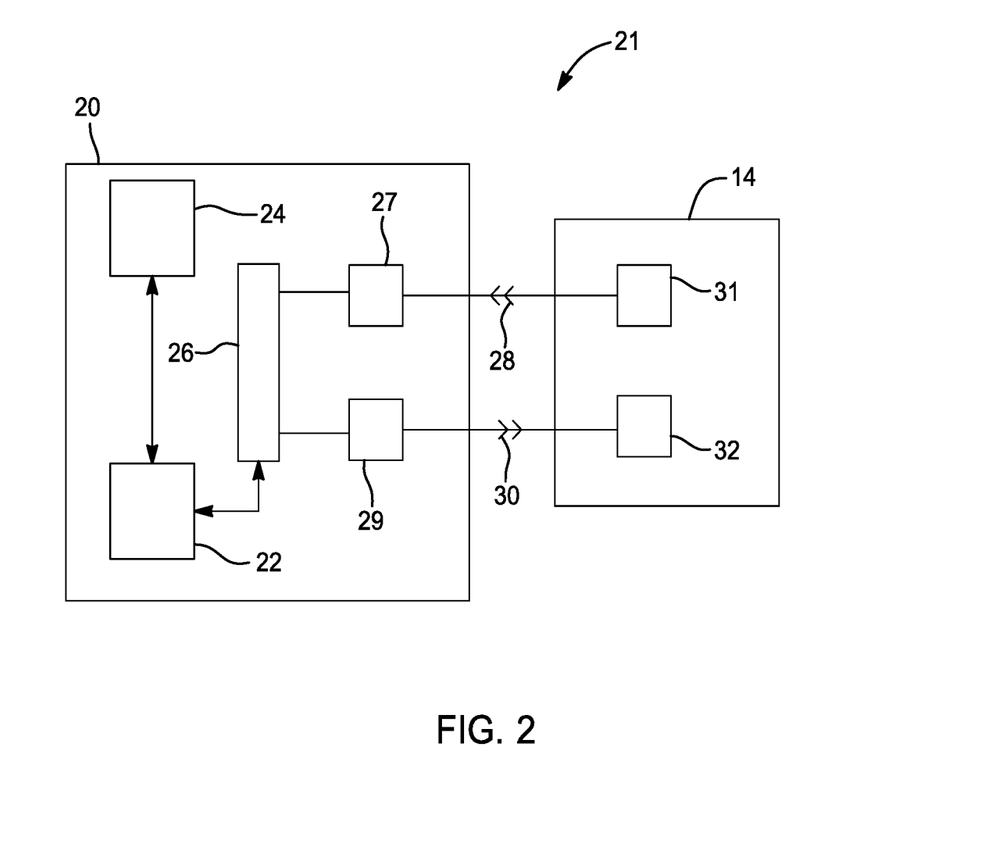
FIG. 2 is a diagram of a control unit for controlling a motor vehicle transmission according to an aspect of the present disclosure.
Figure 3:
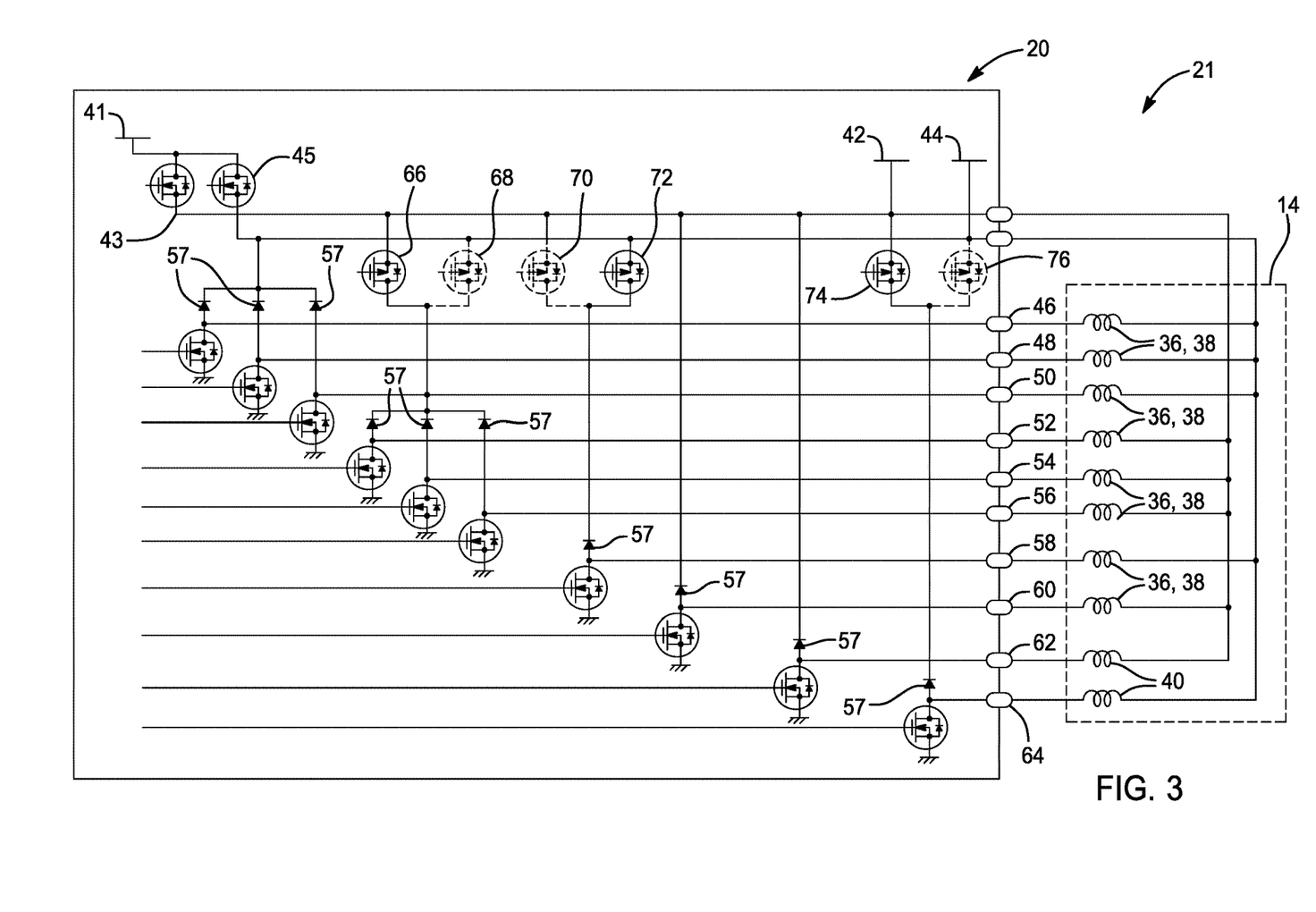
FIG. 3 is a diagram of circuit architecture of a portion of a control unit and a transmission according to an aspect of the present disclosure.

Referring now to FIGS. 2 and 3, and with continuing reference to FIG. 1, in some aspects, the input/output peripherals or ports 26 of the PCU 20 may include logical inputs 27 and logical outputs 29 such as input and output drivers 27, 29. The ports 26 are connected to the transmission 14 by electrical input pins 28 and electrical output pins 30. The electrical input pins 28 are adapted to accept electrical outputs from the transmission 14, such as sensor data from various transmission sensors 31 sensing temperature, speed, position, and the like. In some aspects, sensor data from the sensors 31 is read by the logical inputs 27 of the PCU before entering into calculations carried out by the processor 22. The electrical output pins 30 send electrical signals to the transmission 14, in some cases via logical output drivers 29, thereby controlling the operation of the transmission 14 through various electrical actuators 32. While in FIG. 2 the PCU 20 is shown as only having a single input pin 28 and a single output pin 30, it should be appreciated that depending on the architecture of the transmission 14 the PCU 20 is tasked with controlling, the PCU 20 may have a plurality of input and output pins 28, 30 for receiving and sending electrical information. That is, the PCU 20 may have several input pins 28 and several output pins 30 electrically connectable to a transmission 14. Moreover, the PCU 20 of the present disclosure has an electrical architecture and hardware design adaptable to a variety of different transmission 14 applications. Thus, the PCU 20 has a single hardware design with input and output pins 28, 30 which may be attached to any number of different transmission 14 types and architectures. Thus, a single PCU 20 hardware and circuit architecture design can be mounted to and electronically interface with a plurality of different transmission 14 types, including continuously variable transmissions (CVTs), multi- or dual-clutch transmissions (DCTs), and a variety of different automatic transmissions having any of a wide range of selectable gear ratios.

The PCU 20 is in electrical communication via the input and output pins 28, 30 with a plurality of solenoids 36 in the transmission 14. The solenoids 36 operate to engage a variety of transmission 14 functions. In some examples, the solenoids 36 may be described as variable force solenoids (VFS) 36, variable bleed solenoids (VBS) 38, and binary or mode control solenoids or valves 40. The VFSs or VBSs 36, 38 are operable to provide varying amounts of engagement to transmission 14 componentry by way of proportionally modulating hydraulic pressure, while binary or mode control solenoids or valves 40 are essentially binary, providing pressure or no pressure, and thereby offering only open and closed or ON and OFF functionality. VFSs 36 are generally one of two types: a low-flow VFS 36 used as a signal level device for controlling transmission 14 line pressure or application of clutches; and a high-flow VFS 34 controlling line pressure directly, or used for direct shift clutch control. Transmission solenoids may also be normally low, where current is applied to increase hydraulic pressure or normally high, where current is applied to decrease hydraulic pressure. For example, a VFS 36 controls pressure within a valve body (not specifically shown) of the transmission 14 to control transmission fluid pressure within transmission lines (not shown) of the transmission 14. The VFS 36 may, by provision of controlled transmission fluid line pressure, control and/or modulate the engagement of clutches (not shown) within a multi-clutch transmission. While in the foregoing description, the transmission 14 has been described as having a plurality of solenoids 36, it should be understood that the actual number of solenoids 36, including the actual number of VFSs 36, VBSs 38, and binary or mode control solenoids or valves 40 may vary substantially depending on the type of transmission 14 and the complexity thereof. For example, a three-speed automatic transmission 14 may have significantly fewer VFSs 36 and binary or mode control solenoids or valves 38 and no VBSs as compared to another transmission architecture such as a ten-speed automatic transmission 14 having otherwise similar mechanical and fluid control architecture.

The transmission 14 of the present disclosure includes switchable power on the high side 42, 44 of the VFS 36, VBS 38 or binary or mode control solenoid 40 of the transmission 14, and a switchable ground on a low side 46-50 of the transmission solenoids 36, 38, 40. In other words, voltage (power) supplied to the PCU 20 by a battery 41 or other power source is switchably directable to the transmission solenoids 36, 38, 40 of the transmission 14 via high side drivers (HSDs) 42, 44 of the transmission solenoids 36, 38, 40; and power is switchably directable to ground via low side drivers 46-50 of the transmission solenoids 36, 38, 40. The battery 41 may also be described as an isolated battery 41. When the PCU 20 is powered OFF, discrete switches 43, 45 to the battery 41 move to an open state, thereby preventing current or voltage leakage through the PCU 20 and its constituent components. Switchable power to the high side 42, 44 of the transmission solenoids 36, 38, 40 allows the PCU 20 to engage or disengage operation of the transmission solenoids 36, 38, 40 by selectively and/or incrementally supplying electrical voltage and current (power) to the high side 42, 44 of the transmission solenoids 36, 38, 40.

Electrical voltage and current (power) can also be directed away from circuit componentry on the transmission 14 by driving an HSD 42, 44 to the inactive (OFF) state. Commanding a high side driver to be OFF or inactive, and thereby directing voltage and current (power) away from specific circuit componentry selectively provides a measure of electrical isolation for the transmission solenoids 36, 38, 40. By selectively electrically isolating the transmission solenoids 36, 38, 40, should a fault in operation of the transmission solenoids 36, 38, 40 occur, electrical voltage and current (power) is directed away from faulted circuit componentry, thereby preventing additional cascading faults within other non-faulted circuit componentry while still allowing the transmission management system 21 to operate, though at a reduced level of functionality. In other words, by having switchable power on the high side 42, 44 of the transmission solenoids 36, 38, 40 and switchable ground on the low side 46-64 of the transmission solenoids 36, 38, 40, the circuit architecture of the PCU 20 is structured to minimize potential damage and loss of functionality to the PCU 20, the transmission 14 and the transmission management system 21 more generally. That is, when a fault such as a short occurs within a component of a circuit, electrical current flows through the circuit in an uncontrollable manner. If the short circuit fault occurs on the low side of a transmission solenoid 36, 38, 40, that transmission solenoid 36, 38, 40 will be driven in the active state, regardless of whether or not the transmission management system 21 intends to actuate the transmission solenoid 36, 38, 40, or not. As electrical current flows through the circuit during a fault condition, the current can cause additional circuit components to be oversupplied with electrical current load, potentially leading to other component failures or unintended functional behavior. Additionally, as unintended electrical current flows through a circuit, electromagnetic radiation is emitted by the circuit architecture, and such electromagnetic radiation can influence the operation of other electrical componentry within the PCU 20, the transmission 14 itself, or within nearby and otherwise unassociated electrical componentry within the motor vehicle 10.

Therefore, the circuit architecture of the PCU 20 is structured to functionally group transmission solenoids 36, 38, 40 to specific HSDs 42, 44 so electrical faults such as short to ground, short to power, or open circuits can be electrically isolated, allowing the transmission management system 21 to provide some level of functionality such a default gear ratios to maintain motor vehicle 10 propulsion. The circuit architecture of PCU 20 is structured to control and adapt the current recirculation path of current flowing from a transmission control solenoid 36, 38, 40 to the preferred HSD 42, 44 to minimize the overall length of the recirculation path, and to provide electrical isolation between architected logical and functional groupings of the transmission solenoids 36, 38, 40, while minimizing current loop impedance and electromagnetic radiation interference. For example, in FIG. 3, current control outputs 52, 54, and 56, are grouped to recirculate current to one of two HSDs 42, 44 via software control of discrete switches 66 and 68 by way of recirculation elements or diodes 57. Each of the current control outputs 52, 54, and 56 engage specific transmission 14 components, such as clutch packs, to enable gear ratios, and the like. In the event of a fault, the PCU 20 can direct one or both of the HSDs 42, 44 to be disabled, thereby removing voltage and current (power) from the affected transmission solenoids 36, 38, 40 and removing the ability of the solenoids 36, 38, 40 to influence the state of the transmission 14 and transmission management system. The circuit architecture of the PCU 20 allows discrete switches 66, 70 and 68, 72, and discrete switches or transistors 74, 76 to close thereby selecting a current recirculation path to minimize the rate of current decay with the transmission solenoids 36, 38, 40 being controlled. Allowing closure of discrete switches 66, 70 and 68, 72 also removes the potential for undesirable electrical transients occurring on other components within the PCU 20 or the architecture of the transmission management system 21. In some aspects, in the event of an electrical fault on discrete switches 66, 70 or 68, 72, or discrete switches or transistors 74, 76 the PCU 20 selects a current recirculation path which is less desirable from a loop length, loop impedance, or an electrical fault isolation point of view to prevent undesirable electrical transients and PCU 20 component damage resulting from switching off inductive transmission solenoids 36, 38, 40.

Figure 4:
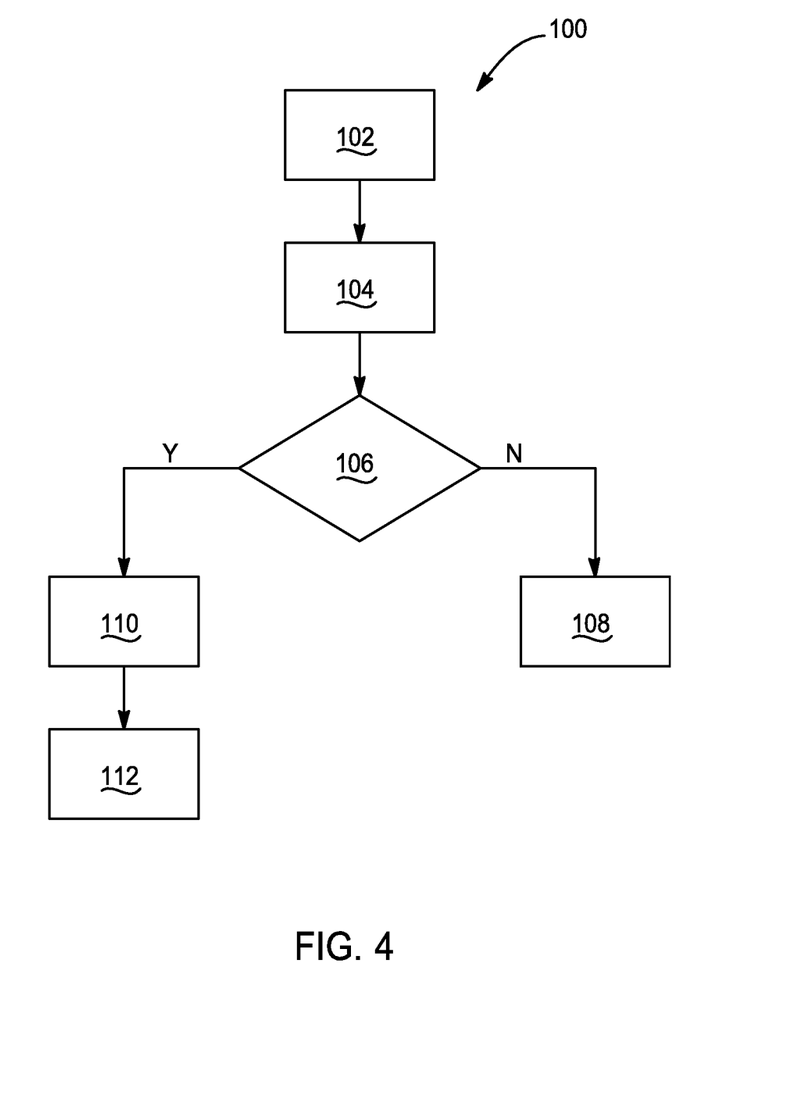
FIG. 4 is a flow diagram illustrating a method of controlling a transmission according to an aspect of the present disclosure.

Referring now to FIG. 4 and with continuing reference to FIGS. 1-3, the processor 22 is configured to execute a method 100 including the control logic or instructions stored in the computer readable memory 24 of the PCU 20. At step 102 the processor 22 executes at least a first control logic stored in memory 24 for, upon powering up the PCU 20, initializing the PCU 20 to recognize the transmission 14. That is, when the PCU 20 is installed on a given transmission 14, the PCU 20 does not "know" to what transmission 14 it is attached. However, upon providing power to the PCU 20 at ignition on or engine 12 start, the PCU 20 performs an initialization check to determine what type of transmission 14 is in electronically communication with the PCU 20.

At step 104, the PCU 20 then utilizes a second control logic stored in memory 24 that selects a predetermined set of instructions associated with the particular transmission 14 and which control the transmission 14 under standard operating conditions. The PCU 20 controls a plurality of HSDs 42, 44 that provide voltage to the high side of the transmission solenoids 36, 38, 40, and low side drivers or LSDs 46-64 on the low side (ground side) of the transmission solenoids 36, 38, 40. The HSDs 42, 44 and LSDs 46-64 enable actuation of the transmission 14. A quantity of the HSDs 42, 44 varies with respect to the transmission 14 type. Moreover, solenoids 36, 38, 40 are logically grouped to provide electrical fault isolation and specific gear ratio activation functionality based on the type of transmission 14. For example, a control system for a CVT may include two HSDs 42, 44, each of the HSDs 42, 44 selectively distributing electrical current to an equal number of transmission solenoids 36, 38, 40 to engage predetermined transmission 14 gear ratios. In another example, a control system for a multi-speed automatic transmission 14 may also include two HSDs 42, 44. However, rather than the HSDs 42, 44 selectively distributing electrical current to an equal number of transmission solenoids, 36, 38, 40 the first HSD 42 selectively distributes electrical voltage and current (power) to a predetermined grouping of transmission solenoids 36, 38 to engage specific clutch packs, thereby engaging predetermined gear ratios, while the second HSD 44 selectively distributes electrical voltage and current (power) to a selection of transmission 14 components which manage transmission fluid line pressure, torque converter clutch, and binary or mode control solenoids or valves 40. By separating clutch pack control from line pressure control, the control system for a multi-speed automatic transmission 14 allows some failure mode functionality that provides an operator of the motor vehicle 10 some ability to drive.

In several aspects, the second control logic proportionally controls an amount of current flowing through a VFS 36, VBS, 38, or binary or mode control solenoids 40 of the transmission 14 via one a plurality of current recirculation paths in the PCU 20 back to the desired HSD 42 or 44. The current recirculation path is selected to minimize the decay of current when the VFS 36, VBS 38, or binary or mode control solenoid 40 is driven in an OFF state. At step 106, the PCU 20 determines whether a fault has occurred in the electronic operation of the transmission 14. If no fault is detected, the method 100 proceeds to step 108 and ends. However, if a fault is detected, the method 100 proceeds to step 110 where the PCU 20 can, upon detection of a fault within the VFS 36, VBS 38 or binary or mode control solenoid 40, perform at least a third logical operation stored in memory 24. The third logical operation selectively shuts down the HSD upon which the fault has occurred. By selectively removing power from the faulted bank of solenoids 36, 38, 40, the PCU 20 can set a mechanical default position of the motor vehicle transmission 14 to maintain motor vehicle 10 propulsion. In addition the PCU 20 can selectively initiate current flow through one of a plurality of current recirculation loops, not just the most ideal loop, to remove undesirable electrical current transients, while a transmission 14 default position is achieved through mode control solenoids or valves 40. In one example in which the PCU 20 is attached to a CVT and selectively initiates current flow through one of a plurality of current recirculation loops, the CVT maintains whichever transmission gear ratio is currently engaged. In another example, in which the PCU 20 is attached to a multi-clutch transmission, such as a DCT, the DCT engages a neutral position. In still another example in which the PCU 20 is attached to an automatic transmission (such as a clutch-to-clutch or C2C transmission), the automatic transmission engages one of a predetermined group of transmission gear ratios depending on a current rate of travel of the motor vehicle 10. In one aspect, when the motor vehicle 10 is traveling at low speed, the PCU 20 engages a low gear ratio to allow some "limp-home" capability at low relatively low speeds. Whereas when the motor vehicle 10 is traveling at a relatively high rate of speed, such as on an interstate highway, the PCU 20 engages a high gear ratio to allow the motor vehicle 10 to maintain highway speeds until it is safe for the operator of the motor vehicle 10 to pull off the highway. In some examples, after reducing the speed of the motor vehicle 10 below a threshold, the PCU 20 may cause the transmission 14 to engage a neutral position. At step 112, once the PCU 20 has performed the third logical operation and controlled current recirculation through the appropriate recirculation path, a warning is displayed to the driver or operator of the motor vehicle 10 and the method ends.

A system and method for controlling a motor vehicle transmission of the present disclosure offers several advantages. These include low cost of production, simplified computer and fluid control architecture, adaptability, and applicability to a wide variety of computer or electrically-controlled transmission 14 types. Additionally, the system and method of the present disclosure improve the reliability and robustness of computer control for such computer or electrically-controlled transmissions 14 by providing a higher degree of redundancy of current recirculation paths.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for controlling a motor vehicle transmission disposed within a motor vehicle comprises:
   electrically connecting a Transmission Control Unit (TCU) or Powertrain Control Unit (PCU) to the motor vehicle transmission, the TCU or PCU having switchable power on a plurality of high side drivers (HSDs) of a plurality of solenoids in a shared functional grouping configuration, and a switchable ground on a plurality of low side drivers (LSDs) of the solenoids, the TCU or PCU controlling operation of the transmission; and
   proportionally controlling an amount of current through a load such as a solenoid via controlling an amount of time current is being sunk through the solenoids to ground and controlling an amount of time current is provided via a recirculation path in the TCU or PCU, the recirculation path decreasing a decay of current when the solenoids are being driven in an OFF state,
   wherein the TCU or PCU includes a single hardware layout, and wherein the TCU or PCU is electronically adaptable to control a plurality of motor vehicle transmission types and solenoid architectures based on any desired functional solenoid grouping.

2. The method of claim 1 wherein the plurality of transmission types comprises a continuously variable transmission (CVT), a dual clutch transmission (DCT), an automatic transmission, and a clutch to clutch (C2C) transmission, and wherein the plurality of solenoids further comprise variable force solenoids (VFS), variable bleed solenoids (VBS), and binary mode solenoids.

3. The method of claim 2 wherein proportionally controlling an amount of current through a load solenoid further comprises decreasing current recirculation path lengths and decreasing current loop impedance.

4. The method of claim 2 wherein proportionally controlling an amount of current through a load such as a solenoid further comprises maintaining electrical isolation between two or more banks of solenoids.

5. The method of claim 2 wherein proportionally controlling an amount of current through a load such as a solenoid further comprises decreasing electromagnetic radiation interference inside or outside of the motor vehicle.

6. The method of claim 1 further comprising modulating line pressure to provide at least one default gear ratio via a plurality of mode control valves, and wherein line pressure control is separated from clutch control within the motor vehicle transmission.

7. The method of claim 1 wherein the TCU or PCU interacts with the plurality of high side drivers (HSDs) enabling actuation of the motor vehicle transmission.

8. The method of claim 7 wherein a quantity of HSDs and solenoid groupings varies with respect to the motor vehicle transmission type and desired motor vehicle transmission behavior during predetermined fault scenarios.

9. The method of claim 7 wherein proportionally controlling an amount of current further comprises selectively initiating current flow through one of a plurality of current recirculation paths back to a desired HSD based upon a defined solenoid grouping and power distribution.

10. A system for controlling a motor vehicle transmission disposed within a motor vehicle comprises:
   a transmission control unit (TCU) or powertrain control unit (PCU) electrically connected via a plurality of input and output pins to a motor vehicle transmission, the TCU or PCU having switchable power on a plurality of high side drivers (HSDs) of a plurality of transmission solenoids in a shared configuration, and a switchable ground on a plurality of low side drivers (LSDs) of the plurality of solenoids;
   a power source providing power to the TCU or PCU;
   the TCU or PCU having a computer readable memory; and
   a processor configured to execute control logic stored in the computer readable memory, the control logic comprising:

a first control logic for initializing the TCU or PCU to recognize the motor vehicle transmission;

a second control logic for utilizing the TCU or PCU to control operation of the transmission;

a third control logic proportionally controlling an amount of current flowing through a solenoid of the transmission via a current recirculation path in the TCU or PCU, the current recirculation path decreasing a decay of current when the solenoid is driven in an OFF state; and a fourth control logic selectively initiating current flow through one of a plurality of current recirculation paths, wherein the TCU or PCU includes a single hardware design configuration, and the TCU or PCU is electronically adaptable to control a plurality of motor vehicle transmission types and solenoid architectures.

11. The system of claim 10 wherein the plurality of transmission types comprises a continuously variable transmission (CVT), a dual clutch transmission (DCT), an automatic transmission, and a clutch to clutch (C2C) transmission, and wherein the plurality of solenoids comprises a variable force solenoid (VFS), variable bleed solenoid (VBS) and a binary or mode control solenoid or valve.

12. The system of claim 10 wherein the third control logic further comprises logic for decreasing current recirculation paths, maintaining electrical isolations between banks of solenoids, decreasing current loop impedance, and decreasing electromagnetic radiation interference both inside and outside of vehicle.

13. The system of claim 10 wherein line pressure control is separated from clutch control.

14. The system of claim 10 further comprising a fifth control logic modulating line pressure to provide at least one default gear ratio via a plurality of mode control valves disposed in the motor vehicle transmission.

15. The system of claim 10 wherein the TCU or PCU interacts with the plurality of HSDs controlling actuation of the transmission, wherein a quantity of HSDs varies with respect to transmission type and a desired grouping of solenoids.

16. The system of claim 15 wherein the third control logic further comprises selectively initiating current flow through one of a plurality of current recirculation paths back to a desired HSD based on preferred groupings.

17. The system of claim 15 wherein when the TCU or PCU is electrically connected to a continuously variable transmission (CVT), the TCU or PCU controls the CVT through an equal or balanced number of solenoid loads per HSD to generate a predetermined set of gear ratios.

18. The system of claim 15 wherein when the TCU or PCU is electrically connected to a clutch to clutch automatic transmission, the TCU or PCU controls the clutch to clutch automatic transmission through an unequal number of solenoid loads per HSD to generate a predetermined set of gear ratios and predetermined clutch activation sequences via a plurality of mode valves.

19. The system of claim 10 wherein the fourth control logic further comprises selecting a current recirculation path based on operating conditions of an engine and the motor vehicle transmission coupled to the engine, to provide either a desired or predetermined default gear ratio.

20. A motor vehicle propulsion system comprising:

an engine;

a transmission mechanically or fluidly coupled to the engine;

an electrical power source providing power to a transmission control unit (TCU) or powertrain control unit (PCU), the TCU or PCU controlling operation of the transmission; the TCU or PCU comprising:

a plurality of input and output pins electrically connectable to the transmission;

switchable power on a plurality of high side drivers (HSDs) of a plurality of solenoids of the transmission in a shared configuration, and a switchable ground on a plurality of low side drivers (LSDs) of the plurality of solenoids;

circuit architecture structured to decrease current recirculation path lengths, provide electrical isolation between logical groupings of solenoids, decrease current loop impedance, and minimize decrease electromagnetic radiation interference;

a computer readable memory; and a processor configured to execute control logic stored in the computer readable memory, the control logic comprising:

a first control logic for upon powering up the TCU or PCU, initializing the TCU or PCU to recognize the motor vehicle transmission;

a second control logic for controlling normal operation of the transmission by proportionally controlling an amount of current flowing through a solenoid of the transmission via a current recirculation path in the TCU or PCU, the current recirculation path minimizing decreasing a decay of current when the solenoid is driven in an OFF state; and a third control logic for, upon detecting a fault; selectively initiating current flow through one of a plurality of current recirculation paths and wherein the TCU or PCU includes a single hardware layout, and the TCU or PCU is electronically adaptable to control a plurality of transmission types and solenoid architectures, and wherein the plurality of solenoids comprises a variable force solenoid (VFS), a variable bleed solenoid (VBS) or and a binary or mode control solenoid.

* * * * *